United States Patent
Craig et al.

(10) Patent No.: US 9,311,005 B2
(45) Date of Patent: Apr. 12, 2016

(54) METHOD TO PREVENT I/O STARVATION OF SLOWER HOSTS IN A MULTI-HOST ENVIRONMENT

(71) Applicant: International Business Machines Corporation, Armonk, NY (US)

(72) Inventors: Matthew R. Craig, Sahuarita, AZ (US); Clint A. Hardy, Tucson, AZ (US); Bret W. Holley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 13/644,897

(22) Filed: Oct. 4, 2012

(65) Prior Publication Data

US 2014/0101256 A1    Apr. 10, 2014

(51) Int. Cl.
*G06F 3/06* (2006.01)

(52) U.S. Cl.
CPC .............. *G06F 3/0611* (2013.01); *G06F 3/067* (2013.01); *G06F 3/0659* (2013.01)

(58) Field of Classification Search
CPC ....... G06F 13/20; G06F 13/00; G06F 3/0607; G06F 3/0611; G06F 3/06061; G06F 3/0601–3/0689; G06F 11/1443–11/1461; G06F 13/122–13/1642; H04L 51/046; H04L 67/06; H04L 67/1097; H04M 3/367; H04M 3/493; H04Q 3/0025–3/0091

USPC ........ 709/200, 202, 206, 223–229; 710/36, 6; 711/114, 170; 379/112.1; 706/50
See application file for complete search history.

(56) References Cited

U.S. PATENT DOCUMENTS

| | | | |
|---|---|---|---|
| 6,349,350 | B1 * | 2/2002 | Hathorn et al. ................. 710/36 |
| 2005/0240649 | A1 * | 10/2005 | Elkington et al. ............. 709/200 |
| 2007/0172038 | A1 * | 7/2007 | Berranger et al. ......... 379/112.1 |
| 2008/0104283 | A1 * | 5/2008 | Shin et al. .......................... 710/6 |
| 2009/0187707 | A1 * | 7/2009 | Benhase et al. ............... 711/114 |
| 2010/0332696 | A1 * | 12/2010 | Muppirala et al. .............. 710/39 |
| 2011/0106746 | A1 * | 5/2011 | Ventilla et al. .................. 706/50 |
| 2011/0225374 | A1 | 9/2011 | Kalos et al. |
| 2012/0054260 | A1 * | 3/2012 | Zanger et al. ................. 709/202 |

* cited by examiner

*Primary Examiner* — Ruolei Zong
*Assistant Examiner* — Raji Krishnan
(74) *Attorney, Agent, or Firm* — Terrile, Cannatti, Chambers & Holland, LLP; Stephen A. Terrile (57) ABSTRACT

A method, system and computer-usable medium are disclosed for managing storage control unit input/output (I/O) operations in a multi-host environment. A storage control unit sends a busy status message when it has exhausted its resources to process new I/O requests. Once the utilization of the storage control unit's resources has subsided to a predetermined upper utilization value, it sends an availability status message to a first predetermined number of host systems that are owed an availability status message. After the first predetermined number of availability status messages are sent, the storage control unit then waits for a predetermined period of time before sending a second predetermined number of availability status messages.

20 Claims, 6 Drawing Sheets

METHOD TO PREVENT I/O STARVATION OF SLOWER HOSTS IN A MULTI-HOST ENVIRONMENT

BACKGROUND OF THE INVENTION

1. Field of the Invention

The present invention relates in general to the field of computers and similar technologies, and in particular to software utilized in this field. Still more particularly, it relates to a method, system and computer-usable medium for managing storage control unit input/output (I/O) operations in a multi-host environment.

2. Description of the Related Art

In a multi-mode, multi-connectivity environment, a host's ability to initiate multiple input/output (I/O) operations with a storage control unit often exceeds the control unit's ability to have sufficient resources to process all incoming I/O requests. When this occurs, the storage control unit will respond with a busy status indicator (such as a CUBusy status message) to the requesting host to indicate that it has exhausted its available resources and is unable to process the current incoming request. The host, upon receiving the busy status message, suspends new I/O requests tier the specified logical path until the storage control unit responds with an availability indicator (such as a CUEnd status message), which indicates that the condition that prevented the previous operation from completing no longer exists.

However, some hosts may be able to respond to the availability status message faster than others when multiple hosts are accessing the same storage control unit. For example, in a Storage Area Network (SAN) configuration, hosts accessing a storage control unit via switches, extenders, and other SAN elements will have a longer path to traverse to access the control unit. Furthermore, some hosts are simply faster due to their design or intrinsic hardware capabilities.

Regardless, once a storage control unit emerges from a busy condition, it will send a availability status message to every logical path that it had previously sent a busy status message. In response, each host that receives the availability status message will redrive its pending I/O requests. However, faster hosts will typically initiate their pending I/O requests sooner than slower hosts. As a result, the slower hosts may be "starved out" as the storage control unit will receive and process I/O requests from the faster hosts first, causing it to exhaust its internal resources before it can process I/O requests from the slower hosts.

SUMMARY OF THE INVENTION

A method, system and computer-usable medium are disclosed for managing storage control unit input/output (I/O) operations in a multi-host environment. In various embodiments, a storage control unit I/O management system is implemented to limit the number of hosts that receive availability status messages from the storage control unit to a subset that it had previously sent busy status messages. In these and other embodiments, limiting the number of busy status messages will allow sufficient time for all hosts to redrive their outstanding I/O, thereby giving slower hosts equal opportunity to access resources managed by the storage control unit.

In these various embodiments, the storage control unit sends a busy status message when it has exhausted its resources to process new I/O requests. Once the utilization of the storage control unit's resources has subsided to a predetermined upper utilization value (e.g. 70%), it enters a controlled availability sending state. In this state, the storage control unit, in a "round-robin" manner, loops through all logical paths to which an availability status message is owed and sends an availability status message to a predetermined number of the next host systems that are owed an availability statue message. In various embodiments, the predetermined number of hosts may be a fixed quantity or dynamically-determined quantity.

After a first predetermined number of availability status messages are sent, the storage control unit then waits for a predetermined period of time before sending a second predetermined number of availability status messages. In one embodiment, the amount of time required for a requesting host to respond to a busy status message is measured. A determination is then made whether the measured response time is greater than the current time delay interval. If so, then the current time delay interval is reset to the measured busy status message response time. In certain embodiments, a factor (e.g., 1.5× multiplier) is applied to the time delay interval to ensure that it is greater than the maximum amount of time required for the slowest host to respond to a busy status message. In certain embodiments, the storage control unit will cease controlled sending of availability status message and resume sending availability status message for all logical paths that are owed an availability status message when the utilization of the storage control unit's resources subsides to a predetermined lower utilization value e.g., 50%).

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for managing storage control unit input/output (I/O) operations in a multi-host environment. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system," Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
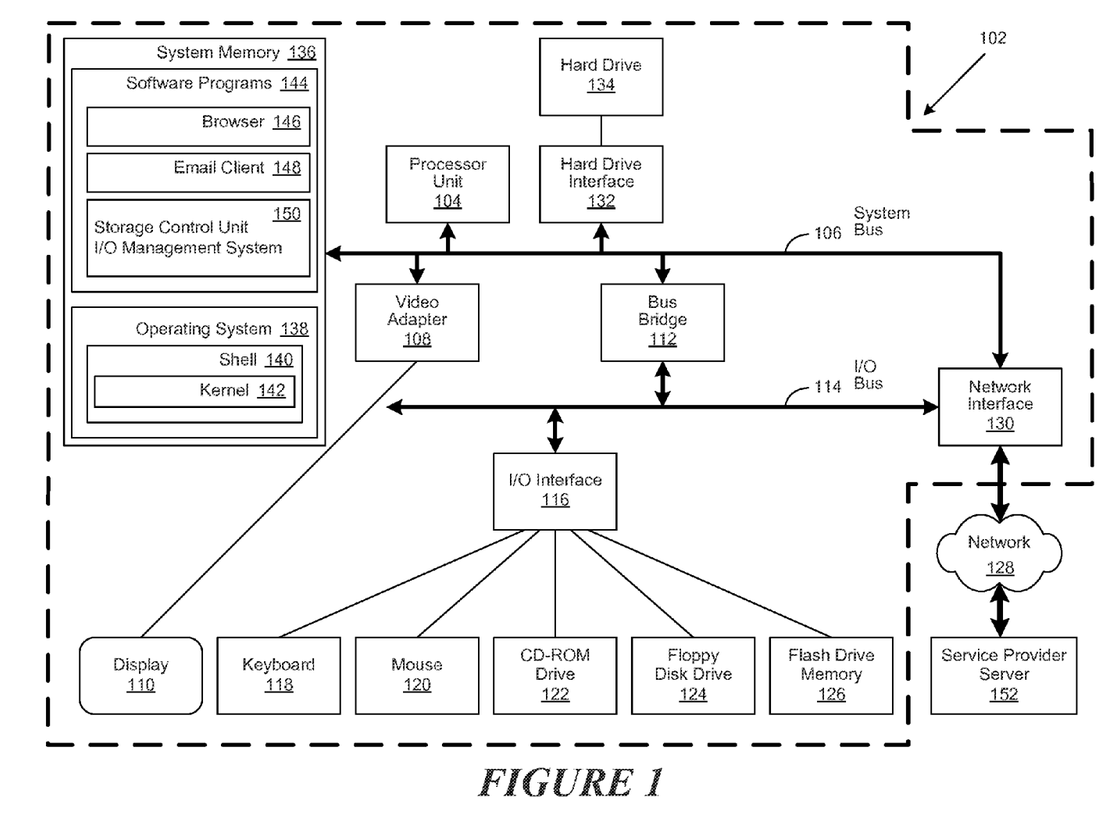
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk—Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a storage control unit input/output (I/O) management system 150. In these and other embodiments, the storage control unit I/O management system 150 includes code for implementing the processes described hereinbelow. In one embodiment, client computer 102 is able to download the storage control unit I/O management system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
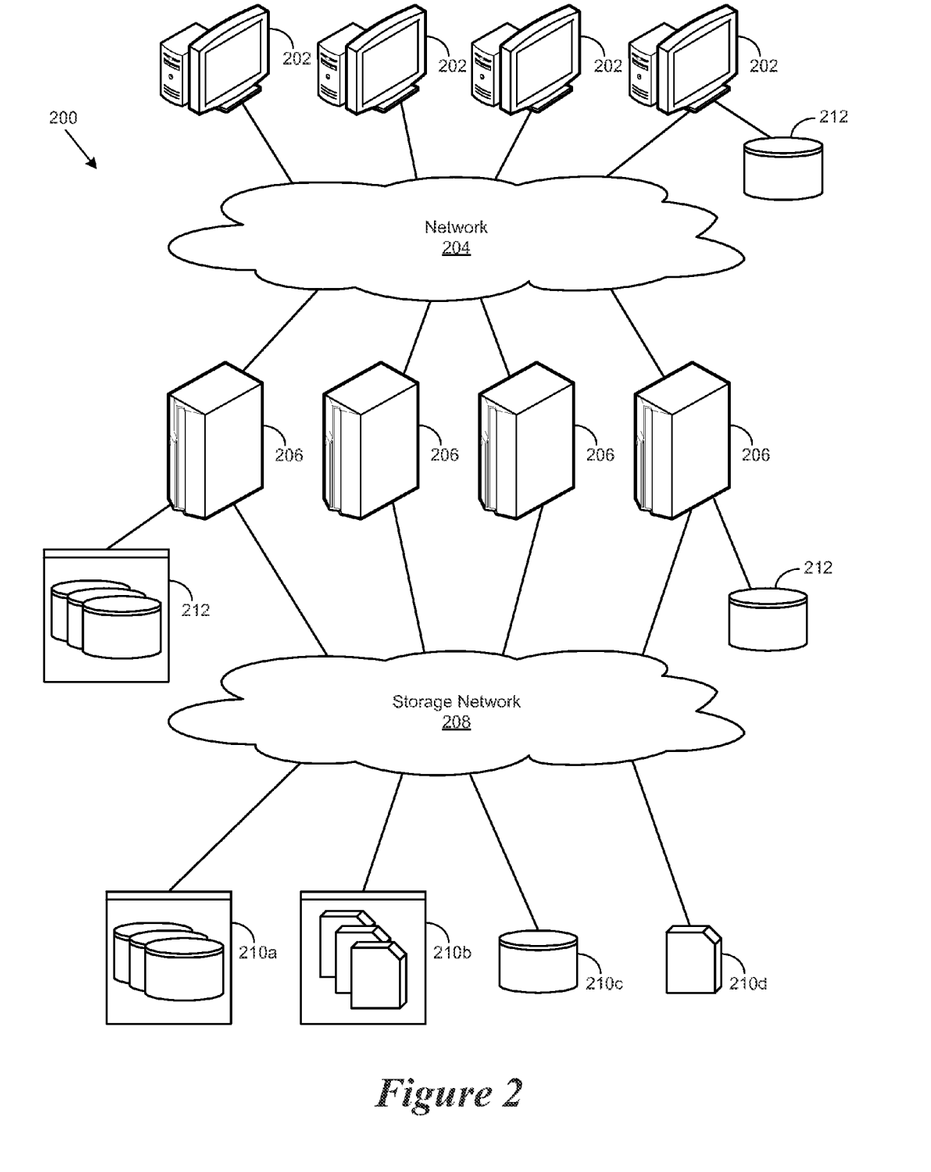
FIG. 2 is a simplified block diagram of a network environment.

FIG. 2 is a simplified block diagram of a network environment as implemented in accordance with an embodiment of the invention. In this embodiment, the network environment 200 includes one or more client systems 202 interconnected by a network 204 to one more host systems 206. In various embodiments, the network 204 may comprise a local-area-network (LAN), a wide-area-network (WAN), the Internet, an intranet, or any other network operable to connect the one or more client systems 202 to the one or more host systems 206. In various embodiments, the client systems 202 may comprise server systems (also referred to herein as "host systems 206"). In certain of these embodiments, such server systems 202 may conduct peer-to-peer sessions with the host systems 206. In general, client systems 202 may initiate communication sessions, whereas host systems 206 may wait for requests from the client systems 202. In certain embodiments, the client systems 202 and host systems 206 may connect to one or more internal or external direct-attached storage systems 212 (e.g., arrays of hard disk drives, solid-state drives, tape drives, etc.). In these and other embodiments, the client systems 202, host systems 206, and direct-attached storage systems 212 may communicate using protocols such as ATA, SATA, SCSI, SAS, Fibre Channel, or the like.

in various embodiments, the network environment 200 may comprise a storage network 208, such as a storage-area-network (SAN) or a LAN (e.g., when using network-attached storage). In these and other embodiments, the storage network 208 connects the host systems 206 to one or more storage systems 210, such as arrays 210a of hard-disk drives or solid-state drives, tape libraries 210b, individual hard-disk drives 210c or solid-state drives 210c, tape drives 210d, CD-ROM libraries, or the like. In embodiments where the storage network 208 is a SAN, the host systems 206 and storage systems 210 may communicate using a networking standard such as Fibre Channel (FC).

Figure 3:
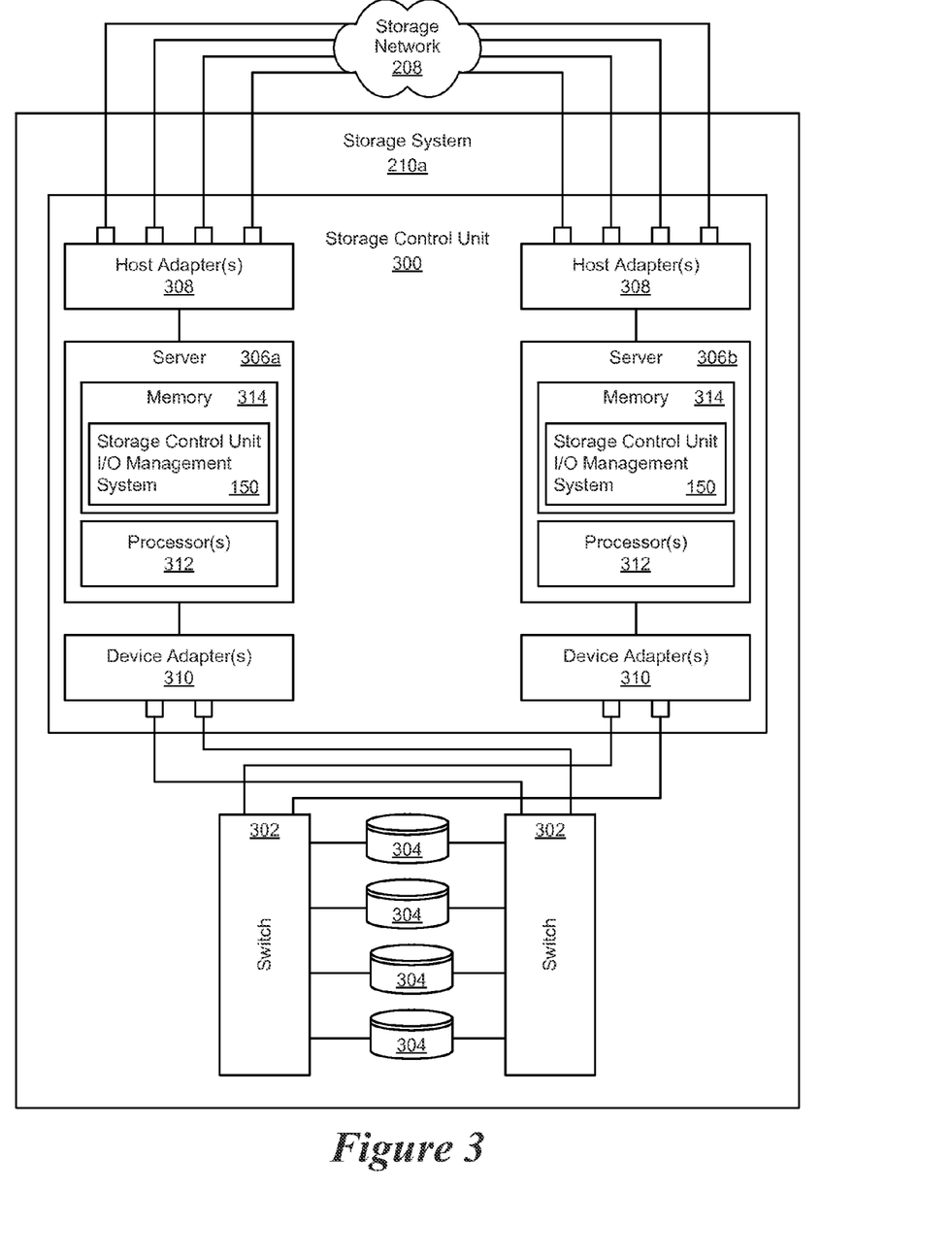
FIG. 3 is a simplified block diagram of a storage system comprising a storage control unit.

FIG. 3 is a simplified block diagram of a storage system comprising a storage control unit as implemented in accordance with an embodiment of the invention. In this embodiment, storage system 210a includes a storage control unit 300, one or more switches 302, and one or more storage devices 304, such as hard-disk drives, solid-state drives (e.g., flash-memory-based drives). In this and other embodiments, the storage control unit 300 may enable one or more host systems 206 to access data stored in the one or more storage devices 304.

In various embodiments, the storage control unit 300 may include one or more servers 306a-b. In these and other embodiments, the storage control unit 300 may also include host adapters 308 and device adapters 310 to connect the storage control unit 300 to host systems 106 and storage devices 304, respectively. In these various embodiments, the multiple servers 306a-b may provide redundancy to ensure that data is always available to connected host systems 206. As a result, if server 306a fails, the other server 306b may remain functional to ensure that I/O is able to continue between the host systems 206 and the storage devices 304. This process may be referred to as a "failover."

As shown in FIG. 3, each server 306a-b includes one or more processors 312 (e.g., n-way symmetric multiprocessors) and memory 314. In these and other embodiments, the memory 314 may include volatile memory (e.g., RAM) as well as non-volatile memory (e.g., ROM, EPROM, EEPROM, hard disks, flash memory, etc.). The volatile memory and non-volatile memory may store software modules, such as a storage control unit I/O management system 150, that run on the processor(s) 312 and are used to access data in the storage devices 304. The servers 306a-b may host at least one instance of these software modules. In certain embodiments, these software modules may manage all read and write requests to logical volumes in the storage devices 304.

In various embodiments, a host system 206 may communicate with a storage control unit 300, which controls physical storage (e.g., storage devices 304). In these and other embodiments, the physical storage that is controlled by the storage control unit 300 may be represented logically as a plurality of logical path resources within the storage control unit 300. Applications in the host system 206 may perform input/output (I/O) operations with respect to the logical path resources of the storage control unit 300. For example, an application in the host computer 206 may write to logical path resources. In turn, the storage control unit 300 may maintain a correspondence between the logical path resources and storage media in the physical storage via logical and physical volumes. While data may be physically written to the storage media in the physical storage under the control of the storage control unit 300, as far as an application in the host computer is concerned, the application performs write operations with respect to the logical path resources.

Skilled practitioners of the art are aware that when a storage control unit 300 reaches a condition in which it lacks the resources necessary to process new I/O requests from a system host 206, it will send a busy status message, such as a CUBusy message defined in the Fibre Connection (FICON) protocol. The busy status message indicates that the system host 206 should not initiate any further I/O operations on the specified logical path until the storage control unit 300 sends a subsequent availability status, such as a CUEnd message, likewise defined in the Fibre Connection (FICON) protocol, to the channel.

In general, this approach to I/O management has been sufficient, as host systems 206 will simply redrive their I/O until a target storage control unit 300 has available resources. However, as multi-system environments become more heterogeneous, there is no guarantee that slower host systems 206 will be able to immediately initiate their redriven I/O with the storage control unit 300 before they once again encounter a busy condition. As a result, the slower host systems 206 may be "starved out" as the storage control unit 300 will receive and process I/O requests from faster host systems 206 first, causing it to exhaust its internal resources before it can process I/O requests from slower host systems 206.

In various embodiments, a storage control unit I/O management system 150 is implemented to limit the number of host systems 206 that receive availability status messages from the storage control unit 300 to a subset that it had previously sent busy status messages. In these and other embodiments, limiting the number of availability status messages will allow sufficient time for all host systems 206 to redrive their outstanding I/O, thereby giving slower hosts equal opportunity to access resources managed by the storage control unit 300.

In these various embodiments, the storage control unit 300 first sends a busy status message when it has exhausted its resources to process new I/O requests. Once the storage control unit 300 has reached this busy condition, it will continue to send busy status messages in response to new I/O requests until the utilization of its resources has subsided to a predetermined UpperUtilizationValue value. As used herein, the UpperUtilizationValue value refers to an upper percentage (e.g., 70%) of a storage control unit's resources.

Once the utilization of the storage control unit's 300 resources has subsided to the predetermined UpperUtilizationValue value, it enters a controlled availability state. In this state, the storage control unit 300, in a "round-robin" manner, loops through all logical paths to which an availability status message is owed and sends an availability status message to a predetermined number of the next host systems 206 that are owed an availability statue message. In various embodiments, the predetermined number of hosts is referenced by a LogicalPathQty. As used herein, LogicalPathQty refers to a quantity of logical paths in an AvailabitityMessageOwed path list that are selected to initiate availability status messages. In certain of these embodiments, the LogicalPathQnty may variously be a fixed quantity or dynamically-determined quantity.

After a first LogicalPathQnty of availability status messages is sent, the storage control unit 300 will then wait a predetermined period of time before sending a second LogicalPathQnty of availability status messages. In various embodiments, the predetermined time period may variously be a static time interval or dynamically-determined time interval. In one embodiment, the amount of time required for a requesting system host 206 to respond to a busy status message is measured. A determination is then made whether the measured response time is greater than the current AvailabilityDelay value, which is equivalent to the current availability status message delay time interval. If so, then the current AvailabilityDelay value is reset to the measured busy status message response time. From the foregoing, skilled practitioners of the art will realize that the AvailabilityDelay value will eventually be equivalent to the amount of time required for the slowest host in a multi-host environment to respond to a busy status message. In certain embodiments, a factor (e.g., 1.5× multiplier) is applied to the AvailabilityDelay value to ensure that it is greater than the maximum amount of time required for the slowest host to respond to a busy status message.

In certain embodiments, the previous LogicalPathQnty of logical paths are placed in a mode where new I/O requests to those paths will receive busy status messages when the storage control unit 300 moves to the subsequent LogicalPathQnty of logical paths. If the utilization of the storage control unit's 300 resources subsides to a predetermined LowerUtilizationValue value, it will then cease controlled sending of availability status message and resume sending availability status message for all logical paths that are owed an availability status message. As used herein, the LowerUtilizationValue refers to a lower percentage (e.g., 50%) of a storage control unit's 300 resources.

In certain embodiments, the storage control unit 300 keeps track of the logical path in which the last controlled availability status message was sent, and if its resources are once again exhausted, and a busy status message must be sent, it will return to the last logical path when it once again initiates controlled availability status message management. In various embodiments, the storage control unit 300 will cease controlled availability status message management operations if it completes the entire list of logical paths without once again reaching the condition where it must send busy status message.

Figure 4:
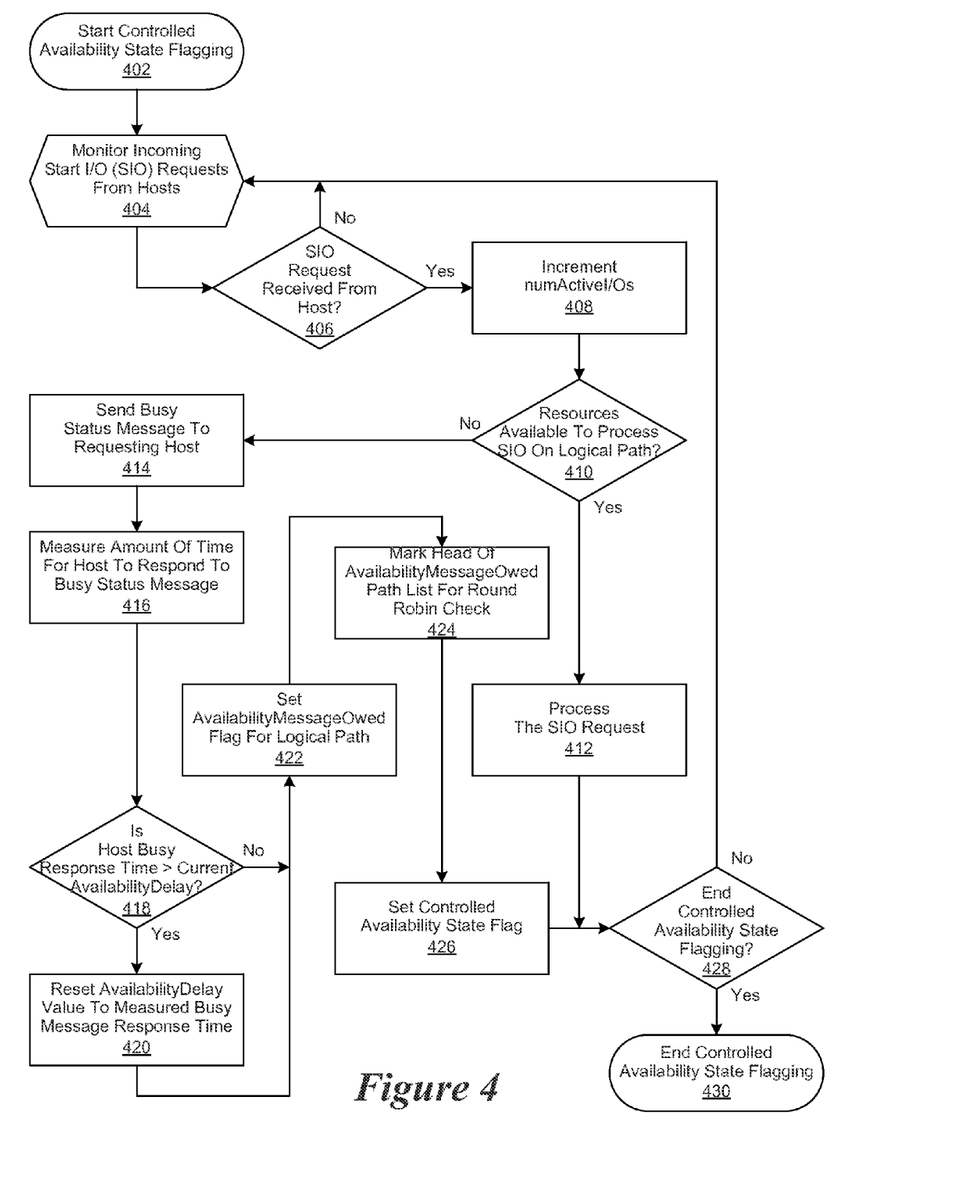
FIG. 4 is a generalized flowchart of the operation of controlled availability state flagging operations.

FIG. 4 is a generalized flowchart of the operation of controlled availability state flagging operations as implemented in an embodiment of the invention. In this embodiment, controlled availability state flagging operations are begun in step 402, followed by a storage control unit monitoring incoming Start I/O (SIO) requests from hosts in step 404. A determination is then made in step 406 whether an SIO request has been received from a host. If not, then the process is continued, proceeding with step 404. Otherwise, the number of active I/O's ("numActiveI/Os") for the storage control unit is incremented in step 408.

A determination is then made in step 410 whether the storage control unit has sufficient resources available to process the SIO request. If so, then the SIO request is processed in step 412, followed by a determination being made in step 428 whether to end controlled availability state flagging operations. If not, then the process is continued, proceeding with step 404. Otherwise, controlled availability state flagging operations are ended in step 430.

However, if it is determined in step 410 that the storage control unit has insufficient resources to process the SIO on its corresponding logical path, then a busy status message is sent to the requesting host in step 414. The amount of time required for the requesting host to respond to the busy status message is measured in step 416, followed by a determination being made in step 418 whether the measured response time is greater than the current AvailabilityDelay value, which is equivalent to the current availability status message delay time interval. If so, then the current AvailabilityDelay value is reset to the measured busy status message response time in step 420.

If it is determined in step 418 that the measured response time is less than the current AvailabilityDelay value, or once the AvailabilityDelay value has been reset in step 420, an AvailabilityMessageOwed flag is set in step 422 for the requesting host's logical path. Thereafter, the head of an AvailabilityMessageOwed path list is marked in step 424 for subsequent "round robin" checks and a controlled availability state flag is set in step 426. A determination is then made in step 428 whether to end controlled availability state flagging operations. If not, then the process is continued, proceeding with step 402. Otherwise, controlled availability state flagging operations are ended in step 430.

Figure 5A:
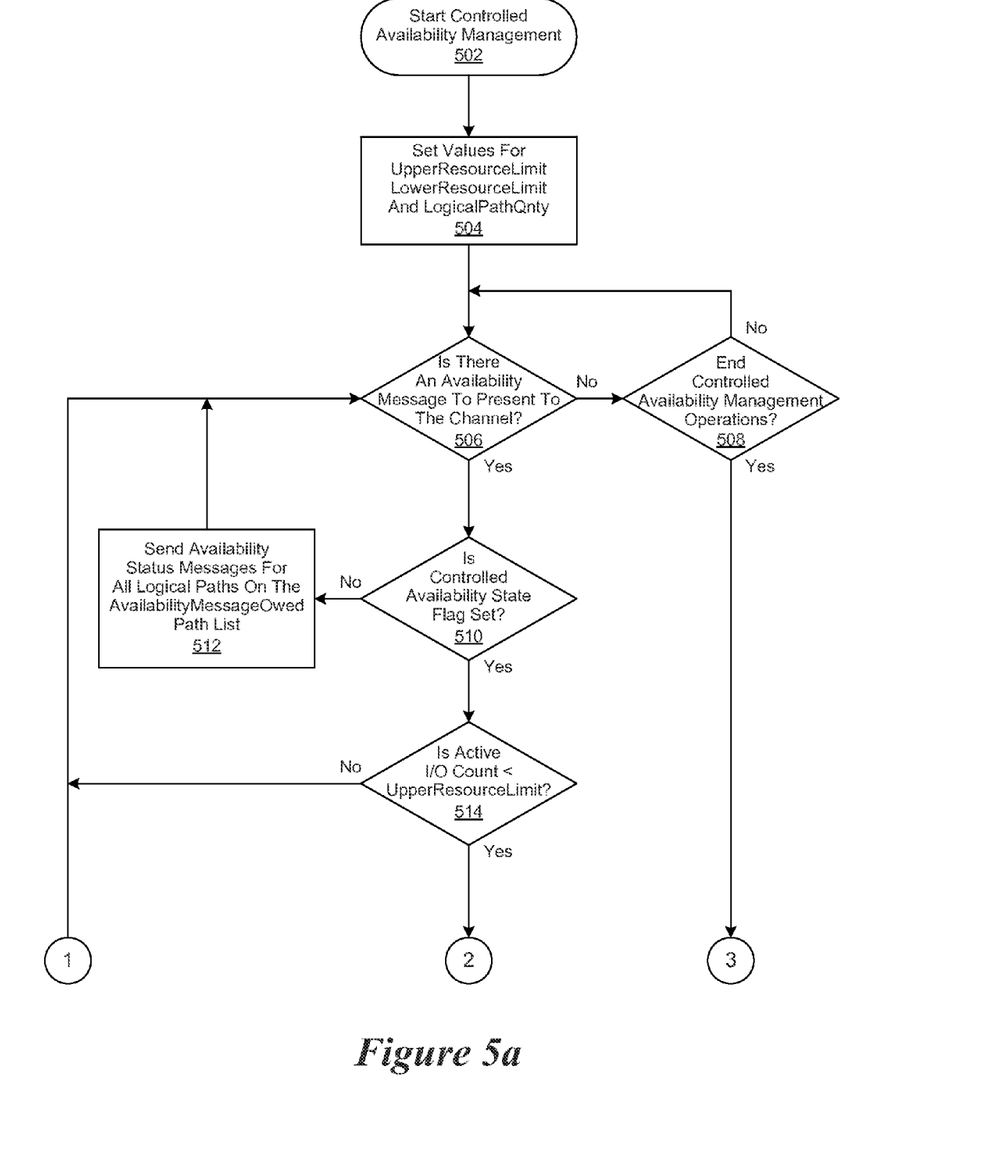
FIGS. 5*a-b* are a generalized flowchart of the operation of controlled availability status message management operations.
Figure 5B:
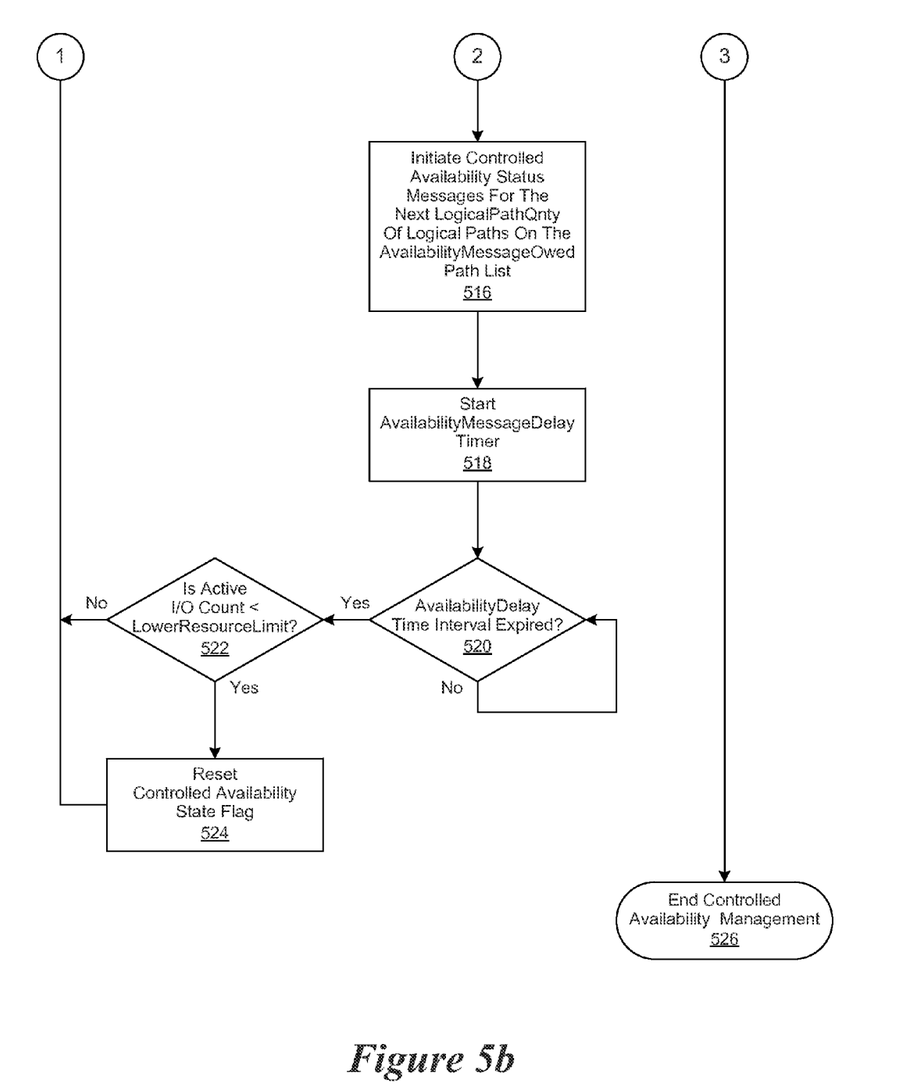

FIGS. 5*a-b* are a generalized flowchart of the operation of controlled availability status message management operations as implemented in an embodiment of the invention. In this embodiment, controlled availability status message management operations are begun in step 502, followed by values being set for UpperUtilizationValue, LowerUtilizationValue, and LogicalPathQty in step 504. Once the values for the UpperUtilizationValue, LowerUtilizationValue, and LogicalPathQty have been set in step 504, a determination is made in step 506 whether there is an availability status message to present to the channel. If not, then a determination is made in step 508 whether to end controlled availability status message management operations. If not, then the process is continued, proceeding with step 506. Otherwise, controlled availability status message management operations are ended in step 526.

However, if it is determined in step 506 that there is an availability status message to present to the channel, then a determination is made in step 510 whether the controlled availability state flag has been set. If not, then an availability status message is sent to all logical paths on the AvailabilityMessageOwed path list in step 512 and the process is continued, proceeding with step 506. Otherwise, a determination is made in step 514 whether the storage control unit's active I/O count is less than the UpperUtilizationValue value set in step 504. If not, then the process is continued, proceeding with step 506. Otherwise, controlled availability status messages are initiated in step 516 for the next number of logical paths in the AvailabilityMessageOwed path list defined by the value for LogicalPathQty set in step 506.

Then, in step 518, an AvailabilityDelay timer is begun, followed by a determination being made in step 520 whether the AvailabilityDelay time interval has expired. Once it has been determined in step 520 that the AvailabilityDelay time interval has expired, a determination is made in step 522 whether the storage control unit's active I/O count is less than the LowerUtilizationValue value set in step 504. If not, then the process is continued, proceeding with step 506. Otherwise, the controlled availability state flag is reset in step 524 and the process is continued, proceeding with step 506.

Although the present invention has been described in detail, it should be understood that various changes, substitutions and alterations can be made hereto without departing from the spirit and scope of the invention as defined by the appended claims.

What is claimed is:

1. A computer-implemented method for managing storage control unit input/output (I/O) operations in a multi-host environment, comprising:
generating a set of busy status messages in response to receiving a corresponding set of I/O requests generated by an associated set of hosts, the set of busy status messages generated by a storage control unit when it has insufficient resources to process the set of I/O requests, each of the set of busy status messages comprising a CUBusy message, the CUBusy message being defined by a Fibre Connection protocol;
generating a set of availability status messages when the utilization of the storage control unit's resources subsides to a first utilization value, the first utilization value representing a percentage of resources of the storage control unit, the set of availability status messages corresponding to the set of busy status messages, each of the set of availability status messages comprising a CUEnd message, the CUEnd message being defined by the Fibre Connection protocol;
providing a first subset of the set of availability status messages to a first subset of the set of hosts; and
providing a second subset of the set of availability status messages to a second subset of the set of hosts, the provision of the second subset of the set of availability status messages delayed until a predetermined time interval has elapsed.

2. The method of claim 1, wherein the provision of the second subset of the set of availability status messages is not delayed when the utilization of the storage control unit's resources subsides to a second utilization value.

3. The method of claim 1, wherein the predetermined time interval is determined by a first amount of time required for a first host of the set of hosts to respond to a first busy status message of the set of busy status messages.

4. The method of claim 3, wherein:
a second amount of time is compared to the first amount of time, the second amount of time determined by the amount of time required for a second host of the set of hosts to respond to a second busy status message of the set of busy status messages; and
the predetermined time interval is determined by the greater of the first and second amounts of time.

5. The method of claim 4, wherein the predetermined time interval is increased by a predetermined factor.

6. The method of claim 1, wherein the number of hosts that are members of the first and second subsets of the set of hosts are determined by one of the set of:
a fixed number; and
a dynamically generated number.

7. A system comprising:
a processor;
a data bus coupled to the processor; and
a computer-usable medium embodying computer program code, the computer-usable medium being coupled to the data bus, the computer program code used for managing control unit input/output (I/O) operations in a multi-host environment and comprising instructions executable by the processor and configured for:
generating a set of busy status messages in response to receiving a corresponding set of I/O requests generated by an associated set of hosts, the set of busy status messages generated by a storage control unit when it has insufficient resources to process the set of I/O requests, each of the set of busy status messages comprising a CUBusy message, the CUBusy message being defined by a Fibre Connection protocol;
generating a set of availability status messages when the utilization of the storage control unit's resources subsides to a first utilization value, the first utilization value representing a percentage of resources of the storage control unit, the set of availability status messages corresponding to the set of busy status messages, each of the set of availability status messages comprising a CUEnd message, the CUEnd message being defined by the Fibre Connection protocol;
providing a first subset of the set of availability status messages to a first subset of the set of hosts; and
providing a second subset of the set of availability status messages to a second subset of the set of hosts, the provision of the second subset of the set of availability status messages delayed until a predetermined time interval has elapsed.

8. The system of claim 7, wherein the provision of the second subset of the set of availability status messages is not delayed when the utilization of the storage control unit's resources subsides to a second utilization value.

9. The system of claim 7, wherein the predetermined time interval is determined by a first amount of time required for a first host of the set of hosts to respond to a first busy status message of the set of busy status messages.

10. The system of claim 9, wherein:
a second amount of time is compared to the first amount of time, the second amount of time determined by the amount of time required for a second host of the set of hosts to respond to a second busy status message of the set of busy status messages; and
the predetermined time interval is determined by the greater of the first and second amounts of time.

11. The system of claim 10, wherein the predetermined time interval is increased by a predetermined factor.

12. The system of claim 7, wherein the number of hosts that are members of the first and second subsets of the set of hosts are determined by one of the set of:
a fixed number; and
a dynamically generated number.

13. A non-transitory, computer-readable storage medium embodying computer program code, the computer program code comprising computer executable instructions configured for:
generating a set of busy status messages in response to receiving a corresponding set of I/O requests generated by an associated set of hosts, the set of busy status messages generated by a storage control unit when it has insufficient resources to process the set of I/O requests, each of the set of busy status messages comprising a CUBusy message, the CUBusy message being defined by a Fibre Connection protocol;
generating a set of availability status messages when the utilization of the storage control unit's resources subsides to a first utilization value, the first utilization value representing a percentage of resources of the storage control unit, the set of availability status messages corresponding to the set of busy status messages, each of the set of availability status messages comprising a CUEnd message, the CUEnd message being defined by the Fibre Connection protocol;

providing a first subset of the set of availability status messages to a first subset of the set of hosts; and providing a second subset of the set of availability status messages to a second subset of the set of hosts, the provision of the second subset of the set of availability status messages delayed until a predetermined time interval has elapsed.

14. The non-transitory, computer-readable storage medium of claim 13, wherein the provision of the second subset of the set of availability status messages is not delayed when the utilization of the storage control unit's resources subsides to a second utilization value.

15. The non-transitory, computer-readable storage medium of claim 13, wherein the predetermined time interval is determined by a first amount of time required for a first host of the set of hosts to respond to a first busy status message of the set of busy status messages.

16. The non-transitory, computer-readable storage medium of claim 15, wherein:

a second amount of time is compared to the first amount of time, the second amount of time determined by the amount of time required for a second host of the set of hosts to respond to a second busy status message of the set of busy status messages; and the predetermined time interval is determined by the greater of the first and second amounts of time.

17. The non-transitory, computer-readable storage medium of claim 16, wherein the predetermined time interval is increased by a predetermined factor.

18. The non-transitory, computer-readable storage medium of claim 13, wherein the number of hosts that are members of the first and second subsets of the set of hosts are determined by one of the set of:

a fixed number; and a dynamically generated number.

19. The non-transitory, computer-readable storage medium of claim 13, wherein the computer executable instructions are deployable to a client computer from a server at a remote location.

20. The non-transitory, computer-readable storage medium of claim 13, wherein the computer executable instructions are provided by a service provider to a customer on an on-demand basis.

* * * * *